United States Patent

Rooks

[15] 3,668,641

[45] June 6, 1972

[54] DISPLAY APPARATUS HAVING PLURAL GAS DIODE STAGES

[72] Inventor: John C. Rooks, Northfield, Minn.

[73] Assignee: G. T. Schjeldahl Company, Northfield, Minn.

[22] Filed: Mar. 30, 1970

[21] Appl. No.: 23,899

[52] U.S. Cl. ....................340/168, 340/167

[51] Int. Cl. ....................H04q 3/00

[58] Field of Search ....................340/168 SR

[56] References Cited

UNITED STATES PATENTS

| | | | |
|---|---|---|---|
| 2,861,216 | 11/1958 | England | 340/168 SR |
| 3,225,342 | 12/1965 | Clark | 340/168 SR |
| 3,493,933 | 2/1970 | Brooks | 340/168 SR |

*Primary Examiner*—Harold I. Pitts
*Attorney*—Orrin M. Haugen

[57] ABSTRACT

A sequentially addressable apparatus utilizing a drive circuit incorporating gas-filled diodes as the active element thereof. Means are provided for coupling an input signal representative of a condition to be displayed to the system, with the input signal being coupled to the first stage of the system, and with each succeeding stage being coupled to its own immediately succeeding stage such that signals representing the state of each discrete stage can be propagated from stage to stage. The breakdown of a gas-filled diode in a first stage of a multi-stage display permits current to flow through a path including a capacitor, thereby charging up the capacitor in response to the current flow. The residual charge on the capacitor when added to the voltage applied to the system provides a potential level which exceeds the ignition potential of the gas-filled diode in the second stage, thus causing ignition of the gas-filled diode for the second stage. When the condition being represented is such that the breakdown of the gas-filled diode in the first stage is not desired, the system will transfer this condition in a similar fashion. Thus, the system is capable of transferring representative conditions from the first stage to succeeding stages.

2 Claims, 4 Drawing Figures

INVENTOR
JOHN C. ROOKS
BY Orrin M. Haugen
ATTORNEY

INVENTOR
JOHN C. ROOKS
BY Orrin M. Haugen
ATTORNEY

DISPLAY APPARATUS HAVING PLURAL GAS DIODE STAGES

BACKGROUND OF THE INVENTION

In my co-pending application, Ser. No. 24,159, filed Mar. 31, 1970, and entitled "SEQUENTIALLY ADDRESSABLE ALPHA-NUMERIC DISPLAY DEVICE" and assigned to the same assignee of this application, a means for driving a display device is disclosed utilizing a shift register arrangement which is relatively simple in construction and economical in terms of electrical components. It is considered expedient in electroluminescent display systems for the drive circuits of the display panel to be relatively inexpensive because of the large number of such circuits employed in a system. The invention disclosed and claimed in my co-pending application entitled "SEQUENTIALLY ADDRESSABLE ALPHA-NUMERIC DISPLAY DEVICE" eliminates the requirement for expensive components such as transistors and the like, with semi-conductor diodes being used to couple the gas-filled diode across a pair of voltage buses.

In certain electroluminescent displays and display systems, it is found expedient to employ a multi-stage counter of the type incorporating gas-filled diodes (neon glow tubes) as the active element. Such electroluminescent displays utilize the light intensity produced by the firing of the glow tube to either provide a direct read-out or to illuminate photosensitive resistors employed to perform a function in a display selection matrix. Where the display system is large, it is essential that the gas-filled diode ring counter be quite simple and economical in terms of circuit components, so as to simplify servicing and to reduce the total cost of the display.

The present invention is concerned with the design of a sequentially addressable display employing a neon glow tube shift register which is capable of coupling an input signal representative of a condition to the first stage of the display with each succeeding stage being coupled to its own succeeding stage for the sequential transfer of its immediate condition on to its neighbor. The system of the present invention is capable of transferring conditions represented by a glowing or lighted neon glow tube as well as a condition represented by an extinguished glow tube.

In its simplest form, the circuit of the present invention comprises a pair of voltage buses which are adapted to receive a pattern of pulses for operating the circuit. A plurality of individual stages are coupled between these two buses, each stage including a series combination of a neon glow tube, an impedance element represented by either a resistor or semi-conductor diode, a capacitor, and a second impedance element represented by a semi-conductor diode. The output signal which appears at the junction between the capacitor and the second impedance element (semi-conductor diode) relatively coupled to the neon glow tube of an adjacent or succeeding stage in the system. As long as no input trigger signal is applied to the neon glow tube of the first stage, the signals applied to the voltage buses will not cause the neon glow tubes in any stages to fire. However, after a trigger pulse is applied to ignite the first neon glow tube in the chain, a charge builds up on the capacitor for that stage such that when the input pulses applied to the buses again establish a potential difference, the voltage on the capacitor is added to this difference to exceed the firing or ignition point of the neon glow tube of the succeeding stage. Thus, the input signal may be made to provide a visual indication of a condition, and this indication or condition can be made to propagate down the chain to the ultimate stage. If the output of the last stage is connected to the input of the first stage, a ring type circuit results. By introducing digital data in serial fashion to the input terminal of the first stage in synchronism with the voltage pulses applied to the first and second buses, the circuit of this invention is capable of converting serial data into parallel form. While the description of the present invention indicates a sequential transfer from left to right, it will be appreciated that for certain systems, a more convenient input would be accomplished if the input were at the right-hand most stage, and the transfer or propagation of information proceeded from right to left.

The system of the present invention is readily adaptable for using in connection with alpha-numeric displays. For example, the apparatus may be utilized in connection with a conventional seven-bar display system wherein each stage is represented by seven separate or individual and independently operated circuits. Thus, by an appropriate encoding of signals, the stages can be coupled together so as to provide a visual output of an electrical signal input in the form of numeric indicia. Thus, a sequence of numbers can be addressed to a multi-stage arrangement so as to provide digital output in accordance with an indicated condition.

It will be appreciated, of course, that through the addition of neon glow tubes to the array, alphabetical or combined alpha-numeric displays are possible. Each of the neon tubes is, of course, displayed in the form of an appropriate portion of a character, such as, for example, elongated rectangular bars or the like. Neon glow tubes of this type are, of course, commercially available.

In the present invention, by selectively controlling the amplitude and by exercising modest control over the frequency of the clock pulse signals applied to the first and second buses, it is possible to provide an extremely simple, reliable, and easily controlled system.

Accordingly, it is a principal object of the present invention to provide an improved means for addressing a display on a sequential basis, the system being simpler and less expensive in its construction than known prior art designs.

A further object of the present invention is to provide a shift register system suitable for use in electroluminescent display systems.

It is yet a further object of the present invention to provide an improved gas-filled diode type counter circuit which is simple, reliable, and economical in its use of circuit components.

These and other objects of the present invention will become apparent to those skilled in the art upon a study of the following specification, appended claims, and accompanying drawings wherein:

Figure 1:
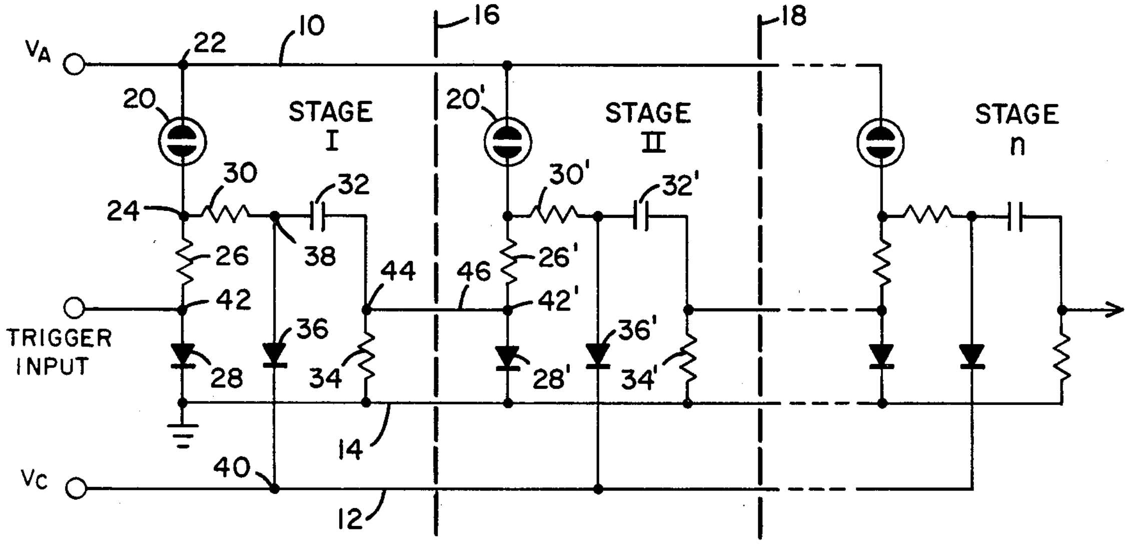
FIG. 1 is an electrical schematic diagram of a first embodiment of the present invention.

Referring now to the embodiment shown in FIG. 1, there is shown a first voltage bus 10 and a second voltage bus 12 to which a pattern of clock pulses may be applied. In addition to these two buses, there is provided a third or ground bus 14. Connected between these buses are a plurality of identical stages which are interconnected to form a counter circuit adaptable to use in a visual electroluminescent display. Specifically, the circuitry arranged to the left of the dashed line 16 forms stage I, with the circuitry between the dashed lines 16 and 18 forming stage II, and with succeeding lower order stages being indicated to the right of the dashed line 18.

Because of the identical circuitry employed in each stage, the same reference numerals are used to identify corresponding components except that in stage II, these identifying numerals are primed.

Each stage of the system includes a gas-filled diode such as a neon glow tube having a first electrode connected at a junction point 22 to the clock bus 10 and a second electrode connected to a junction point 24. Connected in series between the junction 24 and the ground bus 14 is a resistor 26 and a first semi-conductor diode 28. Connected in parallel with these two components is a series circuit including a resistor 30 having a first terminal connected to the junction 24, a capacitor 32 and a second resistor 34. A second semi-conductor diode 36 is connected between junction point 38 and junction point 40 on clock bus 12. Capacitor 32 is also coupled or clamped to ground through semi-conductor diode 28' of stage II.

Triggering input signals are adapted to be applied to the junction 42 between resistor 26 and diode 28. The output from stage I which appears at junction 44 between capacitor 32 and resistor 34 is coupled by a conductor 46 to the corresponding input terminal 42' of stage II. In some embodiments, it has been found that resistor 30 may be a semi-conductor diode or a series combination of a resistor and semi-conductor diode.

As indicated earlier, stages II through n are identical in construction to stage I so that it is deemed unnecessary to explicity describe the circuit interconnections for these additional stages.

OPERATION

Figure 2:
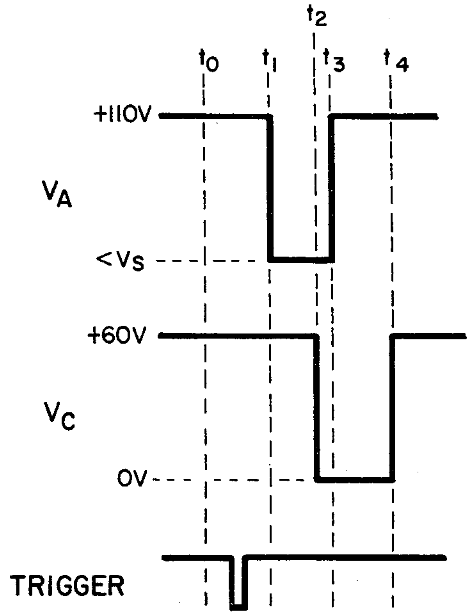
FIG. 2 illustrates the clock pulse signals applied to the embodiment of FIG. 1 to effect the desired operation thereof.

The operation of the circuit of FIG. 1 can best be explained with the aid of the wave forms shown in FIG. 2. The clock pulse signal $V_A$ is adapted to be applied to the clock pulse bus 10 while the clock pulse identified as $V_C$ is adapted to be applied to the bus 12. The gas-filled diodes 20, 20', etc. employed in the circuit of FIG. 1 have an ignition potential of about 110 to 120 volts and a sustaining potential in the range of from about 70 to about 80 volts. The clock pulse signal $V_A$ varies between the 110-volt level or some level slightly below the lowest ignition potential of any gas-filled diode, and a level which is less than the sustaining potential of the neon tube employed. The clock pulse signal $V_C$ typically varies between ground or zero volts and a maximum value of 60 volts.

At time $t_0$, the potential applied on voltage bus 10 ($V_A$) is slightly below the lowest ignition potential of any gas-filled diode, while the voltage on bus 12 ($V_C$) is 60 volts. As such, the net potential difference across the gas-filled diode 20 is slightly below the ignition potential of any gas-filled diode in the system. Hence, the diode 20 remains extinguished and non-conducting.

In the interval between time $t_0$ and $t_1$, a negative going trigger pulse is applied at the junction 42. This negative going pulse momentarily increases the potential difference across the series combination of the neon glow tube 20 and the resistor 26 and the glow tube 20 ignites. Immediately, a current flow is established from the bus 10 through the gas-filled diode 20, resistor 30, capacitor 32, junction 46 and diode 28' to ground. This causes a charge to be placed on the capacitor 32 with the junction 38 being more positive than the junction 44. The trigger pulse applied to the junction 42 can now be removed and the neon glow tube 20 will remain ignited due to current flow through the resistor 26 and diode 28. However, at time $t_1$, when the clock pulse signal $V_A$ drops below the sustaining potential of the diode 20, the lamp will be extinguished. The trigger pulse represents the condition being displayed.

Because the resistance value of resistor 30 is relatively high, there is little or no leakage current through resistor 30, resistor 26, and diode 28 to ground during the short "off" interval of $t_1$ to $t_3$. Hence, the charge which was built up on capacitor 32 remains during this "off" period.

At time $t_2$, the clock pulse applied to the bus 12 falls to zero. Either coincidentally with the dropping of the pulse on bus 12 or shortly thereafter, the clock pulse signal $V_A$ applied to the bus 10 is restored to its previous value of 110 volts. While the drawing shows a finite time between $t_2$ and $t_3$, it will be appreciated that these points of time may be simultaneous. The negative voltage appearing at junction 44 because of the charge on capacitor 32 adds to the potential difference across the neon glow tube 20', and, hence, the ignition potential of the tube is exceeded and it fires. The firing of the glow tube in stage II has two immediate effects, First, the current flows from the bus 10 through the diode 20', resistor 30', capacitor 32' to charge this capacitor in the same fashion as was done when the glow tube in stage I was fired. In addition, and for a limited period of time, a current flows from the bus 10 through the gas-filled diode 20', resistor 26' , conductor 46, capacitor 32 and diode 36 to neutralize any charge which may remain on the capacitor 32. When capacitor 32 is fully discharged, its right-hand plate is clamped at ground potential by means of the diode 28' and current continues to flow through diode 28'.

Thus, it can be seen that stage II is triggered on and a charge is placed on capacitor 32' so that when the cycle of clock pulses $V_A$ and $V_C$ is repeated, the next succeeding stage in line will be fired. The excitation of the gas-filled diodes will thus propagate down the line and if the output appearing at the junction 44 of the final stage is coupled back to the trigger input terminal junction 42, a ring type counter results.

The resistor 34 in each stage has a relatively high ohmic value and is helpful in suppressing noise transients in the circuit, and in eliminating any build up of charge on the capacitors 32 in the circuit. It has been found, however, that the circuit will function properly without this resistor and in certain applications it may be omitted without deleteriously affecting circuit operation.

While no intention is made to limit the circuit design to the precise component values indicated, the circuit of FIGS. 1 and 2 was found to operate satisfactorily when the following component values were employed:

| | |
|---|---|
| $V_C$ | 0–60 volts |
| $V_A$ | 0–110 volts |
| Resistor 26 | 27,000 ohms |
| Resistor 30 | 100,000 ohms |
| Diode 28 | Type 1N270 |
| Diode 36 | Type 1N5059 |
| Capacitor 32 | .1 microfarad |
| Resistor 34 | 10,000,000 ohms |
| Gas-filled diode 20 | NE2H |

ALTERNATE EMBODIMENT

Figure 3:
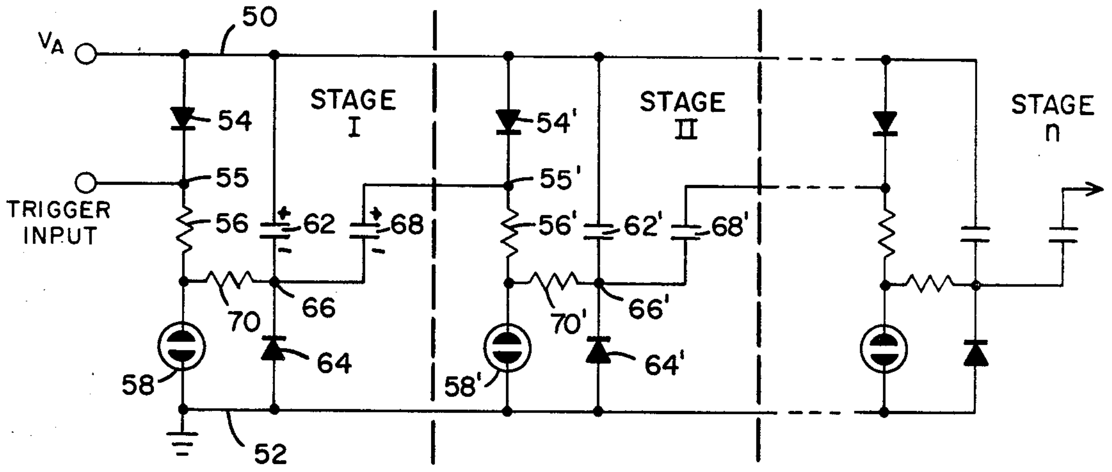
FIG. 3 is a schematic diagram of an alternate embodiment of the invention.

Referring now to FIG. 3, the layout and construction of an alternate embodiment of the invention will be described. In the embodiment of FIG. 3, there are a pair of buses 50 and 52. Clock pulses (FIG. 4) are adapted to be applied to the bus 50 whereas bus 52 is connected to a point of fixed potential such as ground. Again, vertical dashed lines are used to separate stages and by a comparison, it can be seen that the components making up each stage are identical.

More specifically, in each stage there is a series string of components including a first semi-conductor diode 54 having its anode connected to the bus 50 and its cathode connected to a first terminal 55 of a resistor 56. The terminal 55 is also the point at which an input trigger signal may be applied. The other terminal of resistor 56 is connected to a first electrode of a gas-filled diode such as neon tube 58. The other electrode of tube 58 is connected to the ground bus 52.

Also connected between buses 50 and 52 in a series arrangement is a capacitor 62 and a second semi-conductor diode 64. The common point between these two components is identified by the numeral 66 and a coupling capacitor 68 has a first terminal thereof connected to this junction and its other terminal connected to the trigger input terminal 55' of stage II. A resistor 70 is connected between the junction point 66 and the junction between the first electrode of the gas-filled diode 58 and a terminal of resistor 56.

Figure 4:
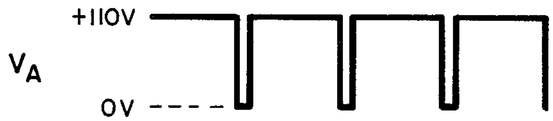
FIG. 4 illustrates the wave forms or clock pulse signals applied to the embodiment of FIG. 3 to effect the desired operation thereof.

FIG. 4 illustrates the wave form used to cycle the embodiment of FIG. 3. It can be seen that this wave has a maximum amplitude which is in excess of the sustaining potential of any of the gas-filled diodes employed, but which is OPERATION — than the ignition potential of any of the gas-filled diodes. Periodically, the wave drops off to a value or level of zero which is below the extinction potential.

OPERATION— FIG. 3

As was mentioned above, the maximum potential applied to the clock bus 50 is less than the ignition potential of any of the tubes. However, when a positive going input signal in excess of the ignition potential is applied to the junction 55, the potential across the neon glow tube 58 exceeds the ignition potential for the tube and it fires. With tube 58 conducting, three current paths are established between the positive bus 50 and the ground bus 52. The first path includes the diode 54, the resistor 56 and the glow tube 58. The second path includes the capacitor 62, the resistor 70 and the glow tube 58. The third path includes the diode 54' of stage II, the capacitor 68, the resistor 70 and the glow tube 58. Hence, as soon as the tube fires, the capacitors 62 and 68 charge up to a predetermined value with the polarity as shown.

As soon as the clock input signals falls to zero, the capacitor 62 discharges rapidly through the diode 64. The charge remains on capacitor 68, however, because the diode 54' and the resistor 70 present such a high impedance that discharge is prevented.

When the clock input signal on bus 50 again returns to its maximum value which is only slightly below the ignition voltage of the neon glow tube, this voltage is supplemented with the voltage present on the capacitor 68 and the ignition point is thus exceeded. Tube 58' therefore fires and the charge remaining on capacitor 68 is dissipated by way of resistor 56' and glow tube 58'. Some of this charge is also distributed to capacitor 62 which is normally larger than capacitor 68.

The ignition of neon glow tube 58' in stage II establishes a current path from the voltage bus 50 through the capacitors 62' and 68' in the same way that capacitors 62 and 68 were charged when the glow tube 58 in stage I was ignited. As the clock pulse (FIG. 4) repeats itself, the excitation of the neon glow tubes in the various successive stages will be triggered. Again, by coupling the capacitor 68 of the final stage back to the trigger input terminal 55 of stage I, a ring counter results.

While no intention is made to limit the circuit design to the precise component values indicated, the circuit of FIGS. 3 and 4 was found to operate satisfactorily when the following component values were employed:

| | |
|---|---|
| $V_A$ | 0–110 volts |
| Resistor **56** | 22,000 ohms |
| Resistor **70** | 1 meg. ohm |
| Capacitor **62** | 0.005 microfarad |
| Capacitor **68** | 0.002 microfarad |
| Diodes **54** and **64** | Type 1N5059 |
| Gas-filled diode **58** | Type NE2H |

The circuit of FIG. 1 may also be used to give an optical parallel output of serial inputted binary data. Specifically, if a serially clocked data stream is applied to the trigger input terminal of stage I in synchronism with the clock type pulses applied to buses 10 and 12, the string of binary 1's and 0's will propagate down the string and may be stopped at any time. When employed in this manner, a glowing tube may represent a binary 1 signal while a dark tube represents a binary 0 signal. When used in this fashion, the circuit of FIG. 1 is readily adaptable to use in an electroluminescent display system. Specifically, the serial data is displayed in the form of lamps which are either lighted or not lighted and these lamps may be employed as either a direct read-out with a series of alpha-numeric characters being propagated along a display chain, or the lamps may be associated with photosensitive cells on a drive matrix so that the current flowing through drive lines associated with an electroluminescent panel may be controlled.

As has been previously indicated, a display system will employ a plurality of individual stages, with each member of the plurality being representative of stage I of the circuit shown in FIG. 1. For example, a conventional seven-bar display assembly will employ seven individual circuits, each having its own series of stages. The gas-filled tube 20 will be displayed in the form of an elongated rectangular bar, and will represent one individual "bar" for the seven-bar numeric display. If desired, an additional set may be employed to provide a visual indication of a decimal point, if indicated.

While the description of the present invention indicates a sequential transfer from left to right, it will be appreciated that for certain systems, a more convenient input would be accomplished if the input were at the right-hand most stage, and the transfer or propagation of information proceeded from right to left.

While I have specifically illustrated two embodiments of my invention, those skilled in the art may perceive of slightly alternate arrangements and circuit values from what I have disclosed.

What is claimed is:

1. A multi-stage sequentially addressable binary circuit comprising:

a. first and second voltage buses and a ground bus;

b. a plurality of stages, each of said stages being substantially identical and including a first resistor and a first semi-conductor diode serially connected with each other and in parallel combination with a series circuit including a second resistor, a capacitor and a third resistor;

c. means including a gas-filled diode connecting said parallel combination between said first voltage bus and said ground bus;

d. a second semi-conductor diode having its anode electrode connected to the junction between said second resistor and a first terminal of said capacitor and having its cathode connected to said second voltage bus;

e. means connecting the other terminal of said capacitor to the junction between said first resistor and said first semi-conductor diode on the next adjacent stage; and f. said first and second voltage buses being adapted to receive a predetermined pattern of clock pulse signals wherein the clock pulse signals applied to said first bus consist of a first signal having a value which is slightly less than the ignition potential and a second signal having a value which is substantially less than the sustaining potential and the signal applied to said second voltage bus lies between ground potential and a value slightly less than said ignition potential but greater than the difference between said ignition potential and said sustaining potential.

2. Apparatus as in claim 1 wherein said gas-filled diodes are neon glow tubes having predetermined ignition and extinction potentials.

* * * * *

UNITED STATES PATENT OFFICE
CERTIFICATE OF CORRECTION

Patent No. 3,668,641 Dated June 6, 1972

Inventor(s) John C. Rooks

It is certified that error appears in the above-identified patent and that said Letters Patent are hereby corrected as shown below:

Column 4, lines 66 and 67, "OPERATION -" should be deleted and the word -- less -- should be inserted.

Signed and sealed this 5th day of September 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334